(12) United States Patent
Bhagat et al.

(10) Patent No.: US 8,949,107 B1
(45) Date of Patent: Feb. 3, 2015

(54) ADJUSTING SEARCH RESULT USER INTERFACES BASED UPON QUERY LANGUAGE

(75) Inventors: Rahul H. Bhagat, Bellevue, WA (US); Michael Brundage, Kirkland, WA (US); Daniel R. Parshall, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 261 days.

(21) Appl. No.: 13/487,989

(22) Filed: Jun. 4, 2012

(51) Int. Cl.
*G06F 17/28* (2006.01)
(52) U.S. Cl.
USPC ............................................ 704/8; 379/88.14
(58) Field of Classification Search
USPC ...................... 704/10, 8; 379/88.14
See application file for complete search history.

(56) References Cited

U.S. PATENT DOCUMENTS

| | | | |
|---|---|---|---|
| 7,027,925 B2 * | 4/2006 | Terentyev et al. | 702/9 |
| 7,047,195 B2 * | 5/2006 | Koizumi et al. | 704/260 |
| 7,634,397 B2 * | 12/2009 | Suen et al. | 704/8 |
| 7,913,228 B2 * | 3/2011 | Ericsson et al. | 717/123 |
| 7,962,477 B2 * | 6/2011 | Hu et al. | 707/722 |

\* cited by examiner

*Primary Examiner* — Susan McFadden
(74) *Attorney, Agent, or Firm* — Thomas | Horstemeyer, LLP (57) ABSTRACT

Disclosed are various embodiments of adjusting a search result user interface when a foreign language search query is detected. A search query associated with a search request is obtained. A language of the search query is identified. An alternative search result user interface is generated when the language varies from an expected language. Additionally, an alternative search query can be generated that is based at least in part upon the originally submitted search query.

22 Claims, 8 Drawing Sheets

ADJUSTING SEARCH RESULT USER INTERFACES BASED UPON QUERY LANGUAGE

BACKGROUND

Consumers are increasingly turning to online retailers for item purchases. Often, customers find the items they want to purchase by using a search engine. After a customer provides a search query to the search engine, the search engine returns a list of items that are determined to be related to the search query. In some scenarios, a user may submit a search query in a language other than a language expected by the search engine.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The present disclosure is related to handling search queries submitted to a search engine that are in a language other than one or more expected languages. In other words, embodiments of the disclosure can detect whether a foreign language search query is submitted to a search engine that facilitates searching of items in a data store, such as, for example, a search for products available via an electronic commerce system. In various embodiments, user interface elements can be adjusted based upon a detection that a language of a search query varies from a local or expected language associated with a search engine. For example, strings, images, or other types of content that are presented in a search result user interface generated in response to submission of a foreign language search query can be modified.

Figure 1:
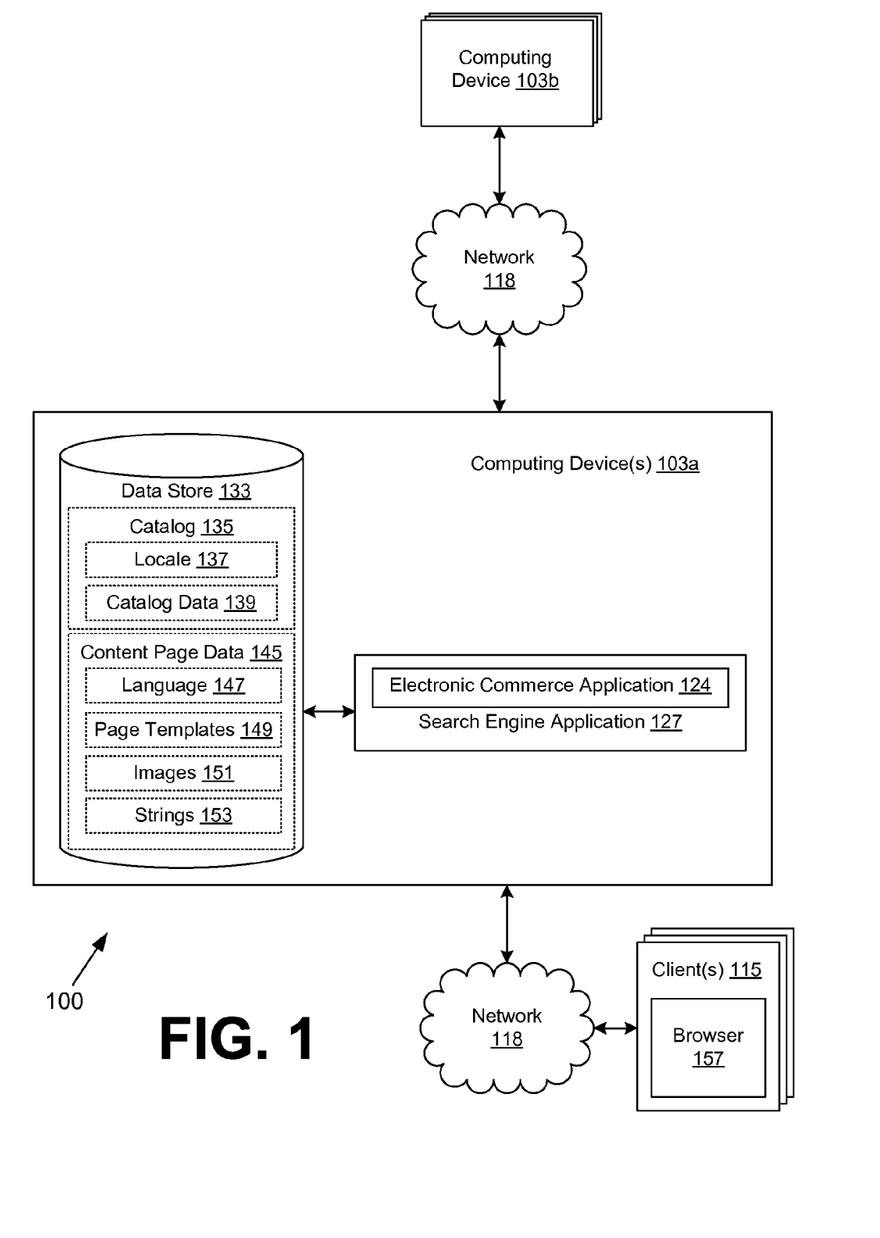
FIG. 1 is a drawing of a networked environment according to various embodiments of the present disclosure.

With reference to FIG. 1, shown is a networked environment 100 according to various embodiments. The networked environment 100 includes at least one computing device 103 that is in data communication with at least one other computing device 103 as well as clients 115 by way of a network 118. The network 118 includes, for example, the Internet, intranets, extranets, wide area networks (WANs), local area networks (LANs), wired networks, wireless networks, or other suitable networks, etc., or any combination of two or more such networks.

Each one of the computing devices 103 may comprise, for example, a server computer or like system. Each one of the computing devices 103 may represent multiple servers arranged, for example, in one or more server banks or other arrangements. Such servers may be located in a single installation or may be dispersed among many different geographical locations. For purposes of convenience, a computing device 103 is referred to herein in the singular. However, in one embodiment, the computing device 103 represents a plurality of servers arranged as described above.

The computing device 103 is configured to execute various applications such as, for example, an electronic commerce application 124. The electronic commerce application 124 is executed to provide item catalog and ordering functionality to customers over the network 118. To this end, the electronic commerce application 124 may include content page server functionality, such as a hypertext transfer protocol (HTTP) server. Alternatively, the electronic commerce application 124 may be in data communication with one or more distinct server applications. The electronic commerce application 124 may further comprise a search engine application 127 that facilitates processing of search queries submitted by users as well as indexing of content that forms a corpus of information against which search queries are executed in order to identify items that are relevant to a search query submitted by a user. It is understood, however, that there are many ways to structure such functionality. In some embodiments, for example, the search engine application 127 may be a standalone application that is executed on a standalone computing device 103. The search engine application 127 is executed to generate a pool of items matching one or more search criteria, such as a search query comprising keywords.

The computing device 103 can be one of many computing devices configured to facilitate a site, such as an electronic commerce site, search engine, or other type of site associated with a particular locale. Additionally, the computing device 103 can communicate via the network 118 with other computing devices 103 configured to facilitate a site associated with a different locale. For example, a first computing device 103 can redirect or submit requests from a client device for a particular site for a particular locale to another site associated with another locale.

Also, the computing device 103 includes a data store 133 and potentially other data stores, which may comprise data and applications operable to provide access to the data. The data store 133 may be used to store data including a catalog 135, content page data 145, and potentially other data. The catalog 135 comprises data regarding one or more catalogs of items offered for sale by one or more merchants. In some embodiments, there may be multiple catalogs 135 maintained in the data store 133 for various sites or locales facilitated by the electronic commerce application 124. Accordingly, each catalog 135 is associated with a locale 137 and/or an identifier that identifies a site with which the catalog 135 is associated. A catalog 135 also includes various catalog data 139 related to the various items that are offered for sale via an electronic commerce site. Catalog data 139 may include many fields of data regarding each item, such as, but not limited to, the following: title, keywords, description, price, weight, shipping methods, related images, reviews, similar items, a list of merchants selling the item, stock number, associated categories, page view history, etc.

The catalog data 139 can also identify locales to which items in the catalog 135 can be sold and/or fulfilled. For example, an item in a catalog 135 associated with the United States locale 137 may be sellable to users accessing an electronic commerce site from Canada, but may not be sellable to users accessing the site from Europe due to manufacturer restrictions, legal limitations, fulfillment or logistics considerations, or other factors.

The data store 133 also includes data that facilitates creation of content pages by the electronic commerce application 124 that are transmitted to a client 115 via the network 118. For example, the electronic commerce application 124 can generate a content page containing a search form to a client 115. Accordingly, when a user submits a search query via the form in such a content page, the electronic commerce application 124 can invoke the search engine application 127, which can execute a search with the submitted search query to identify relevant items in the catalog 135. Therefore, the electronic commerce application 124 generates a content page including a search result user interface, which contains various user interface elements including strings, images, and other data.

Therefore, the content page data 145 contains data used by the electronic commerce application 124 and/or search engine application 127 to generate a content page that is provided to a client 115. The content page data 145 can include a language 147 identifier that specifies the various content page data for a particular language. In order to provide content pages, the electronic commerce application 124 may access the data store 133 to obtain page templates 149, images 151, and strings 153. The page templates 149 act as templates of content pages such as dynamic content pages that may ultimately be populated with the catalog data 139 also stored within the data store 133 (e.g., descriptions, prices, imagery, etc).

The images 151 represent, for example, header imagery, footer imagery, and/or any other type of imagery that is referenced by the page template 149. Similarly, the strings 153 represent textual information that is referenced by the page template 149 and included in a content page transmitted to a client 115. For example, such a string 153 could represent a textual header or footer, or other strings that may not be specifically tied to a particular catalog item presented in the content page. Therefore, for example, the electronic commerce application 124 can generate an English language search result user interface by retrieving a page template 149 associated with the appropriate English language 147 identifier as well as the corresponding images 151 and/or strings 153 associated with the page template 149 that are also associated with the English language 147 identifier.

As contemplated herein, the data store 133 may be representative of many different data stores included in a given system. The data store 133 may comprise, for example, a database or other data storage structure. Additionally, the data store 133 may be implemented in one or more computing devices 103 that are separate from the computing device 103 in which the electronic commerce application 124 and/or search engine application 127 are executed.

The clients 115 may comprise, for example, a computer system such as a desktop, laptop, or other computer system. The clients 115 may also comprise personal digital assistants, cellular telephones, set-top boxes, or other systems with like capability. Further, the clients 115 may also comprise any device that is network capable that may communicate with the computing device 103 over the network 118 to perform various functions. Such clients 115 may comprise, for example, processor-based devices having processor circuits comprising a processor and a memory.

The clients 115 may be configured to execute various applications such as a browser 157 and/or other applications. The browser 157 may be executed in a client 115, for example, to access and render search result pages, network pages, such as web pages, or other network content served up by the computing device 103 and/or other servers. In other embodiments, the functionality performed by the client 115 and the computing device 103 may be performed in a single computer system such as, for example, a standalone kiosk.

Next, a general description of the operation of the various components of the networked environment 100 is provided. To begin, the electronic commerce application 124 can obtain a search query submitted via a client 115 from a browser 157, for example. The search query can be obtained from the browser 157 as a result of a content page rendered in the browser 157 that is configured to submit a search query entered into a search form or other type of input field to the electronic commerce application 124. As example of such a scenario is a user submitted search query via the browser 157 for relevant items in a catalog 135 associated with an electronic commerce site. Upon obtaining the search query, the electronic commerce application 124 can invoke the search engine application 127, which can execute a search of the catalog 135 and/or any other corpus of data to identify relevant search results. Often, the search engine application 127 can generate search results in ranked form, where the search results are ranked according to a measure of relevancy to the search query.

In an embodiment of the disclosure, the search engine application 127 can also identify a language associated with the search query. The electronic commerce application 124 is configured with a particular language or set of languages associated with a locale corresponding to an electronic commerce site. In other words, the electronic commerce application 124 is associated with a particular local or expected language. The language of the search query can be identified by the search engine application 127 using a language detection library and/or algorithm configured to identify a language of a text input. If the language of the search query differs from the expected language associated with the electronic commerce application 124, such a scenario can be handled in various ways. In one embodiment, the search engine application 127 can translate the search query into the expected language using a language translation library and/or algorithm and execute a search using the translated search query to identify search results in the catalog 135 that are relevant to the translated search query. Accordingly, the search engine application 127 can provide at least a subset of the search results to the electronic commerce application 124, which can generate a search result user interface that includes at least a subset of the search results related to the translated search query.

In some embodiments, the search engine application 127 can generate a translated search query and execute a search that identifies search results related to the translated search query and the originally submitted search query. In other words, the search engine application 127 can perform a search using both search queries using an "or" operator. Stated another way, the search engine application 127 transforms the originally submitted search query to a search query that includes both the originally submitted search query and the translated search query. Accordingly, the search results generated by such a search can be ranked by the search engine application 127 according to a ranking algorithm that the search engine application employs to rank search results and included in a search result user interface generated by the electronic commerce application 124.

Such a transformation of the originally submitted query can, in some embodiments, be disabled in certain item categories associated with the product catalog 135. For example, search query transformation can be disabled in item categories of the product catalog 135 where a user may be likely to search by a proper noun. In these scenarios, the intention of the user may be to submit a foreign language query to locate foreign language items in the product catalog 135. For example, search query transformation can be disabled if the user selects a product catalog 135 category, such as, but not limited to books, movies, or other categories in which items exist that contain foreign language terms. The categories for which search query transformation is disabled can be user configurable.

In some embodiments, particularly in the case of an electronic commerce site operating various sites for varying locales and/or languages, when the search engine application 127 detects a search query submitted in a foreign language other than an expected language associated with the electronic commerce application 124, the electronic commerce application 124 can redirect the user to a site associated with a locale and/or language corresponding to the detected foreign language. For example, if a user submits a Chinese language query to a site that is an English version of the site associated with a North American locale, the electronic commerce application 124 can redirect the user to a Chinese language version of the site and/or a site associated with the Chinese locale, which may be operated under a different domain name and by a different computing device 103. As another example, if a user submits a Spanish language search query to a site that is an English version of the site, the electronic commerce application 124 can redirect the user to a Spanish language version of the site.

As another example, the electronic commerce application 124 can submit the foreign language search query to a corresponding electronic commerce application 124 and/or search engine application 127 executing on another computing device 103 via the network 118 that is associated with a site associated with a foreign language site on behalf of the user. The electronic commerce application 124 can then provide search results taken from a catalog 135 of the site associated with the foreign language that are related to the foreign language search query in a search result user interface. For example, if a user submits a Chinese language query to a site that is an English version of the site associated with a North American locale, the electronic commerce application 124 can submit the Chinese language search query to a Chinese language version of the site and/or a site associated with the Chinese locale, obtain corresponding search results, and provide the search results in a search result user interface transmitted to a client 115. As noted above, these search results can be taken from the catalog 135 associated with the foreign language site.

In the case of search results received from another site associated with a foreign language or locale other than the locale associated with the site to which the original search query is submitted, the electronic commerce application 124 can also suppress search results that are associated with items taken from the catalog 135 of the other site that are not sellable or fulfilled in the locale associated with the site corresponding to the electronic commerce application 124 obtaining the original search query and/or the location of the user. As noted above, the electronic commerce application 124 can determine whether an item is sellable or can be fulfilled to a particular location by identifying whether the locale 137 identifier associated with a catalog item corresponds to the location.

The electronic commerce application 124 and/or search engine application 127 can also modify a search result user interface provided to a client 115 depending upon whether the language of a search query submitted to the search engine application 127 differs from the expected languages of the locale associated with the electronic commerce application 124. In other words, the electronic commerce application 124 and/or search engine application 127 can generate an alternative search result user interface. As will be shown in FIGS. 2-5 and as discussed herein, a search result user interface provided by the electronic commerce application 124 and rendered in a browser can be varied. For example, if a language associated with a search query varies from an expected language, the electronic commerce application 124 can modify the search result user interface with varying string and/or image elements referenced by a page template corresponding 149 from which the user interface is generated.

In one embodiment, the content page data 145 can include varying page templates 149 as well as images 151 and strings 153 that are associated with a particular language 147. Accordingly, if the language of the search query corresponds to the expected language, the electronic commerce application 124 can select a page template 149 corresponding to a search result user interface and the expected language 147 identifier. Alternatively, if the language of the search query corresponds to a foreign language, the electronic commerce application 124 can select a page template 149 corresponding to the foreign language, which may reference other images 151 and/or strings 153 that are incorporated into a corresponding search result user interface. For example, a page template 149 corresponding to a foreign language may contain strings that are associated with a header, footer, a navigational element, and/or any other string in the page template, that are translated into the foreign language. As another example, the fonts associated with these strings 153 may vary from the font of corresponding strings in the page template 149 associated with the expected language. For example, although the strings 153 associated with a particular foreign language page template may not contain translated textual elements, the strings 153 may comprise textual elements of varying (e.g., smaller) font size so as to deemphasize the textual elements in the search result user interface when a foreign language query is detected by the search engine application 127.

Additionally, the page template 149 corresponding to a foreign language may contain alternative images that are associated with a header, footer, a navigational element, and/or any other image referenced by the page template. As another example, the image size, characteristic, color, embedded text, or any other aspect of these images 151 may vary from corresponding images 151 of the page template 149 associated with the expected language. For example, the images 151 associated with a particular foreign language page template 149 may be of a different size to emphasize certain graphical elements and/or deemphasize others (e.g., images containing embedded text in the expected language) in the search result user interface when a foreign language query is detected by the search engine application 127. In other words, the images 151 associated with a foreign language page template 149 may deemphasize textual elements that are contained with the images 151.

It should be appreciated that embodiments of the disclosure can employ any one or more combinations of methods to handle detection of a foreign language search query that are described herein. The electronic commerce application 124 and/or search engine application 127 can generate an alternative user interface as well as create an alternative search query depending upon configuration of the system by an operator.

Figure 2:
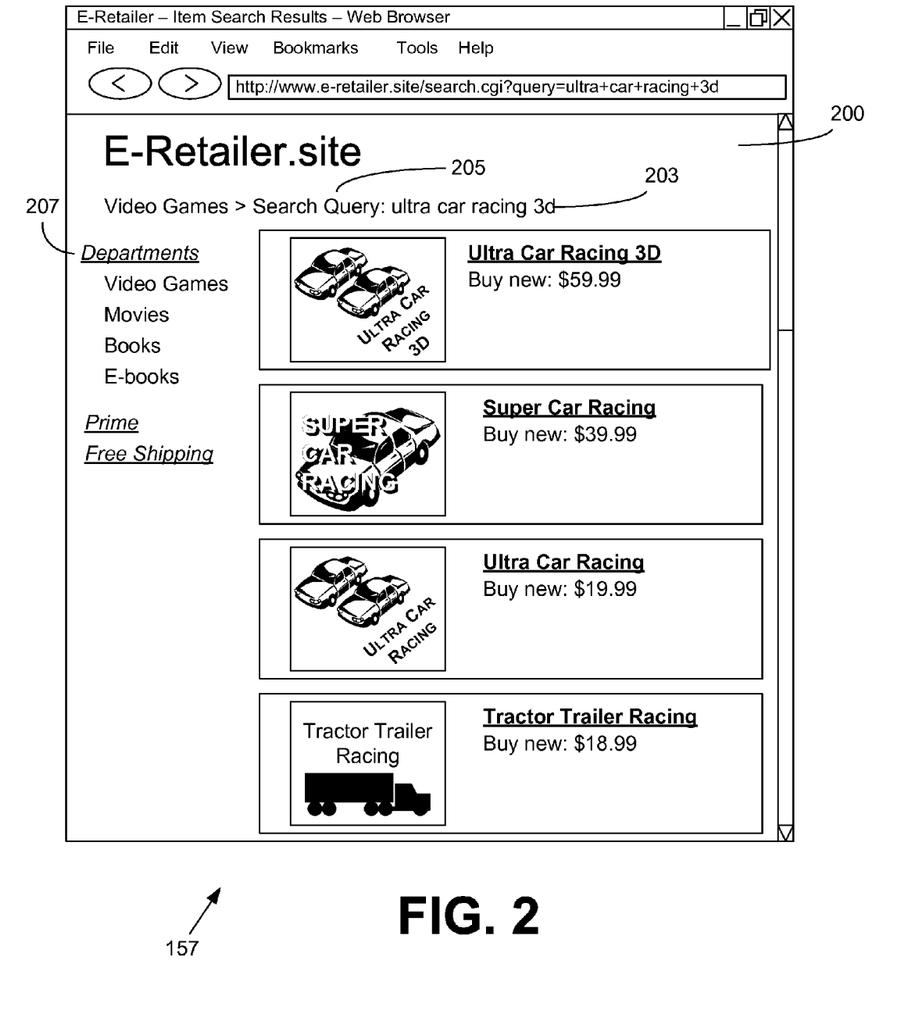
FIGS. 2-5 are drawings of example user interfaces rendered by a client in the networked environment of FIG. 1 according to various embodiments of the present disclosure.

To illustrate the generation of an alternative search result user interface, reference is now made to FIG. 2, which illustrates one example of a search result user interface 200 rendered by browser 157 (FIG. 1) executing in a client 115 (FIG. 1) in the networked environment 100 (FIG. 1) according to various embodiments of the present disclosure. The search result user interface 200 depicts the results of a search query 203 obtained by the electronic commerce application 124 that is executed by the search engine application 127. As shown in the search result user interface 200, the search query 203 is "Ultra Car Racing 3D."

In the depicted example, the electronic commerce application 124 generates the search result user interface 200 from a page template 149 corresponding to language of the search query 203. In this example, the search engine application 127 identifies that the search query 203 corresponds a expected language of the electronic commerce application 124. Therefore, the electronic commerce application 124 selects a page template 149 corresponding to a search result user interface and the expected language 147 as well as populates the search result user interface 200 with search results related to the search query 203. Additionally, the page template 149 references images 151 and strings 153 that also correspond to the expected language. For example, the header 205 and/or left navigational elements 207 may contain images 151 and/or strings 153 that correspond to the expected language.

Figure 3:
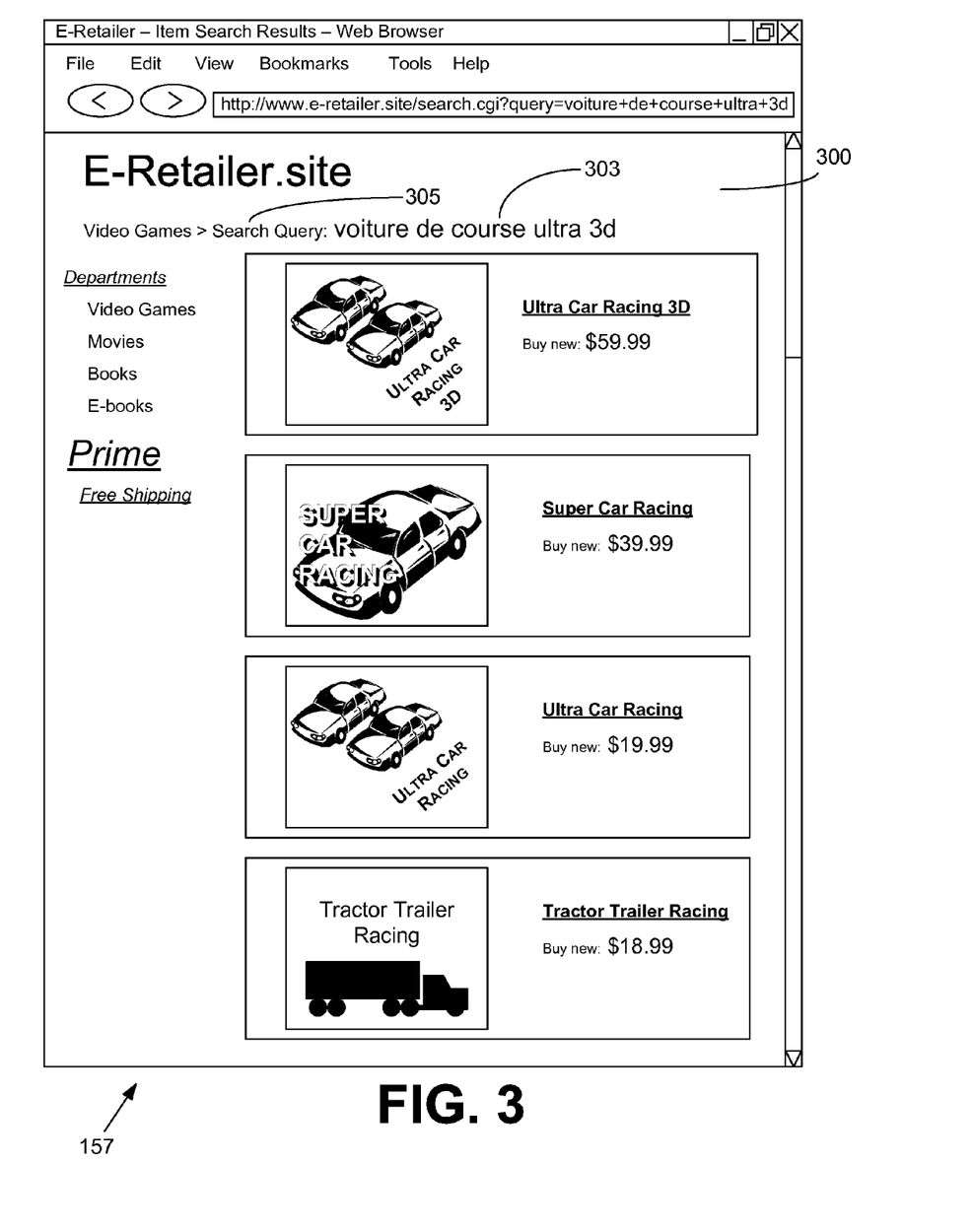

Continuing the example of FIG. 2, reference is now made to FIG. 3, which illustrates an example of a search query 303 submitted via a client that is submitted in a language other than the expected language. In other words, FIG. 3 illustrates an example of a foreign language query. In the depicted example, the electronic commerce application 124 obtains the search query 303 and invokes the search engine application 127 to generate the depicted search result user interface 300. Accordingly, the search engine application 127 can detect that the language of the search query 303 varies from the expected language and cause the electronic commerce application 124 to generate a search result user interface 300 based upon a page template 149 associated with the detected foreign language and/or a page template 149 associated with a language other than the expected language.

As shown in the non-limiting example of FIG. 3, the electronic commerce application 124 generates a search result user interface 300 based upon a page template 149 corresponding to the foreign language. In the depicted example, the page template 149 can specify varying font sizes and/or images for the various images 151 and/or strings 153 referenced by the page template 149 in order to emphasize and/or deemphasize certain textual and/or pictorial elements in the user interface.

In the case of FIG. 3, the page template 149 references certain strings 153 in the expected language that are of a smaller font size relative to the page template 149 corresponding to the expected language. In one embodiment, such a choice can be made to deemphasize textual elements that are in a language that may be unfamiliar to the user if the user is a foreign language speaker. As shown in FIG. 3, a header element 305 can have a smaller font size, whereas the search query 303 can be emphasized in a larger font size, because it may be assumed that the user is familiar with his or her search query 303. Additionally, certain textual elements in the left navigation bar, for example, can be chosen with a smaller font size, while others may be chosen with a larger font size. As another example, the images associated with the search results and/or other images that may be referenced by the page template 149 can be scaled up so that pictorial elements of the user interface are emphasized. As an additional example, images 151 referenced by the page template 149 that are associated with textual, navigational, or other elements can also be chosen with a larger image size to emphasize pictorial elements in the user interface.

Figure 4:
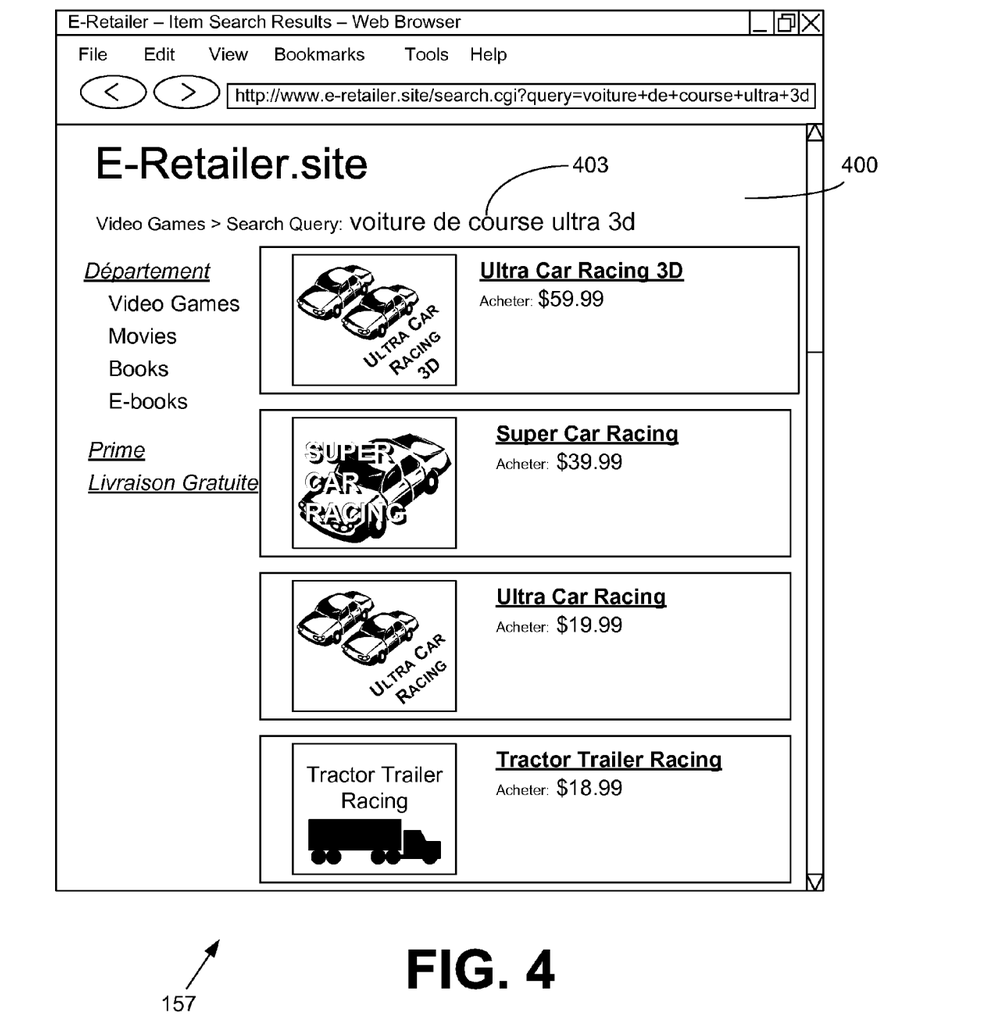

As an alternative example of an alternative search user interface that can be generated by the electronic commerce application 124 in response to a search query, reference is now made to FIG. 4. FIG. 4 depicts a search result user interface 403 in which strings 153 referenced by the page template 149 corresponding to the expected language are translated into the foreign language identified by the search engine application 127. The translated strings associated with the left navigation bar are then inserted into the search result user interface 403. In one embodiment, these translated strings can be stored in the data store 133 as strings 153 that are associated with a page template 149 corresponding to the identified foreign language.

Figure 5:
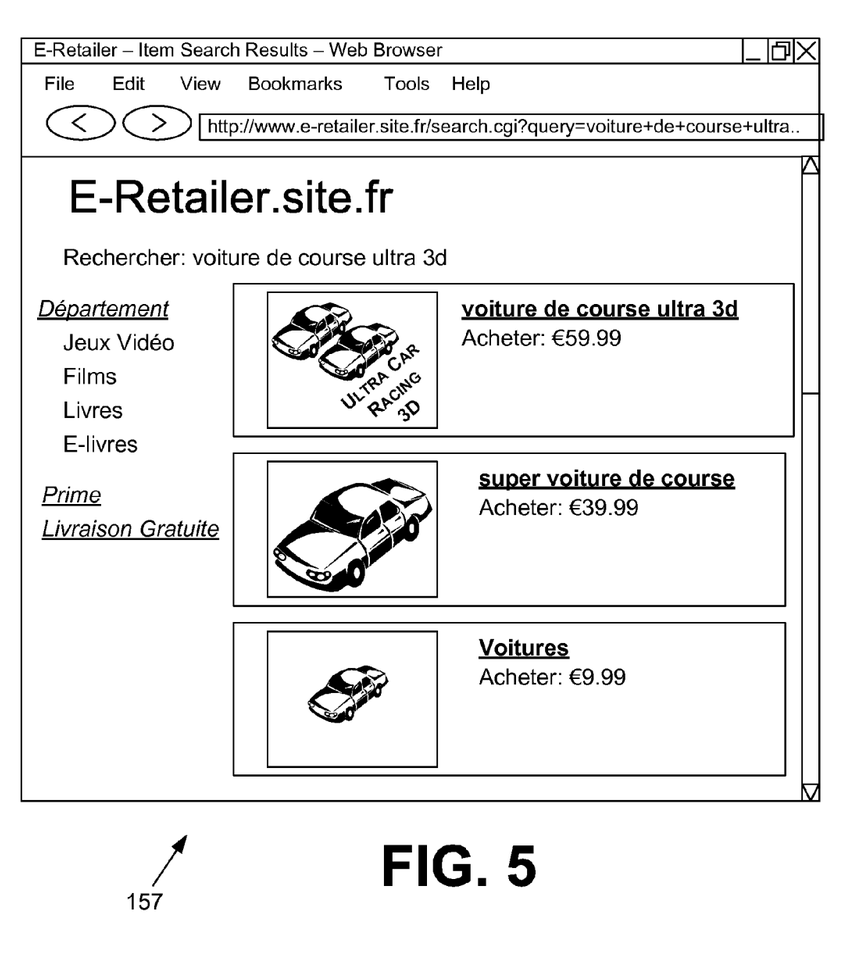

FIG. 5 illustrates an example of how the electronic commerce application 124, upon detection of a foreign language search query, can redirect the search request to another site that is associated with the foreign language. In one embodiment, the electronic commerce application 124 redirects a search request corresponding to a foreign language search query to a site associated with a locale that corresponds to the foreign language identified by the search engine application 127. In another embodiment, the electronic commerce application 124 redirects the search request to a site associated with the foreign language without regard for the locale of the site. In some embodiments, the search engine application 127 can also display an interstitial page, redirect message, or any other alert that informs the user that the submitted query and/or request is being redirected to the other site associated with the foreign language.

Figure 6:
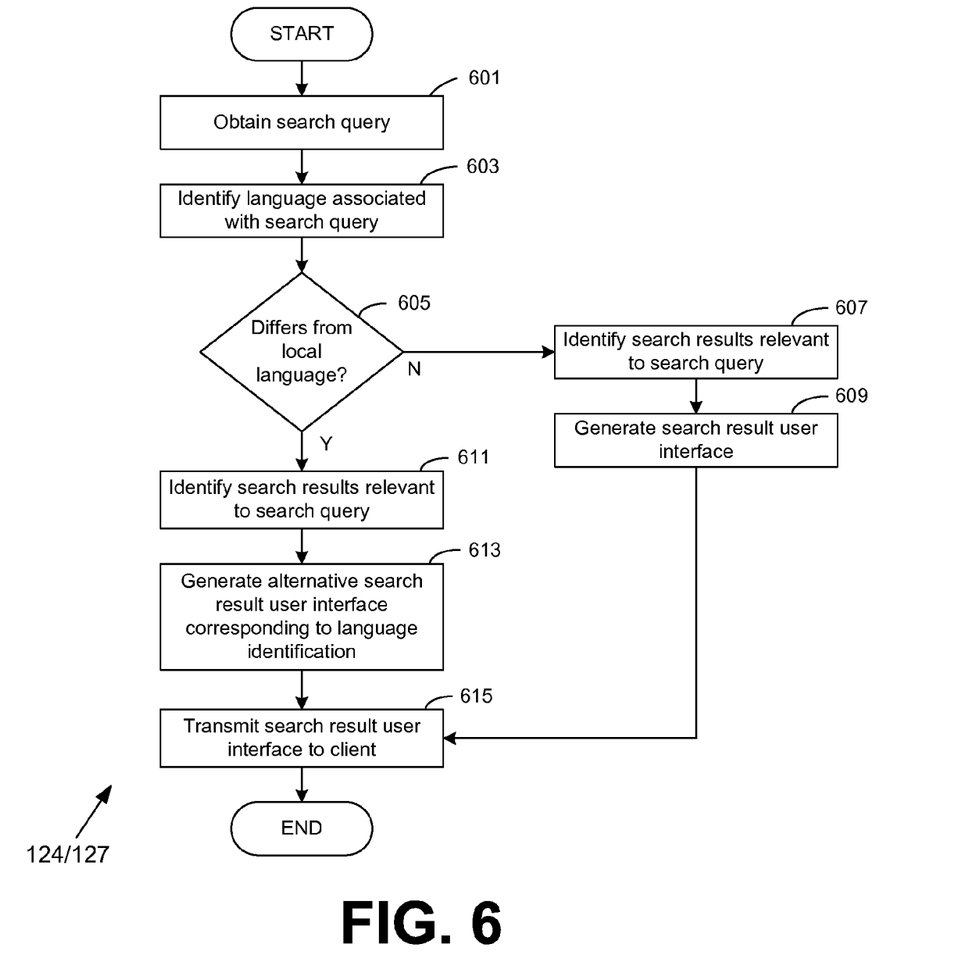
FIGS. 6-7 are flowcharts illustrating examples of functionality implemented as portions of electronic commerce application and search engine application executed in a computing device in the networked environment of FIG. 1 according to various embodiments of the present disclosure.

Moving now to FIG. 6, shown is a flowchart that provides one example of the operation of a portion of the electronic commerce application 124 (FIG. 1) and/or search engine application 127 according to various embodiments. It is understood that the flowchart of FIG. 6 provides merely an example of the many different types of functional arrangements that may be employed to implement the operation of the portion of the functionality as described herein. As an alternative, the flowchart of FIG. 6 may be viewed as depicting an example of steps of a method implemented in the computing device 103 (FIG. 1) according to one or more embodiments.

Beginning with box 601, the electronic commerce application 124 obtains a search query. As described above, the search query can be submitted from a client 115 via a browser 157. The electronic commerce application 124 can invoke the search engine application 127 and in box 603, a language associated with the search query is identified by the search engine application 127. In box 605, the search engine application 124 can determine whether the language of the search query differs from an expected language associated with the electronic commerce application 124. If the language of the search query matches the expected language, then in box 607 the search engine application 127 identifies search results that are relevant to the search query. The electronic commerce application 124 and/or search engine application 127 can generate a search result user interface including at least a subset of the search results in box 609. As described above, the search result user interface can be generated using a page template 149 as well as images 151 and/or strings 153 referenced by the page template 149. In box 615, the search result user interface is transmitted to a client 115 associated with the search request.

If the language of the search query differs from the expected language as determined in box 605, then in box 611, the search engine application 127 identifies search results that are relevant to the foreign language search query. In box 613, an alternative search result user interface is generated containing at least a subset of the search results corresponding to the foreign language search query. As described above, the alternative search result user interface can be based at least in part upon a page template 149 corresponding to the foreign language. In some embodiments, a page template 149 corresponding to a search result user interface can be used where the page template 149 is associated with one or more foreign languages. As described above, the alternative search result user interface can include strings of varying fonts and/or font sizes as well as translated strings. The alternative user interface can also include images of varying sizes. In other words, the page template 149 associated with the foreign language search query can emphasize and/or deemphasize certain textual, graphical, and/or navigational elements in the user interface when the foreign language is detected.

Figure 7:
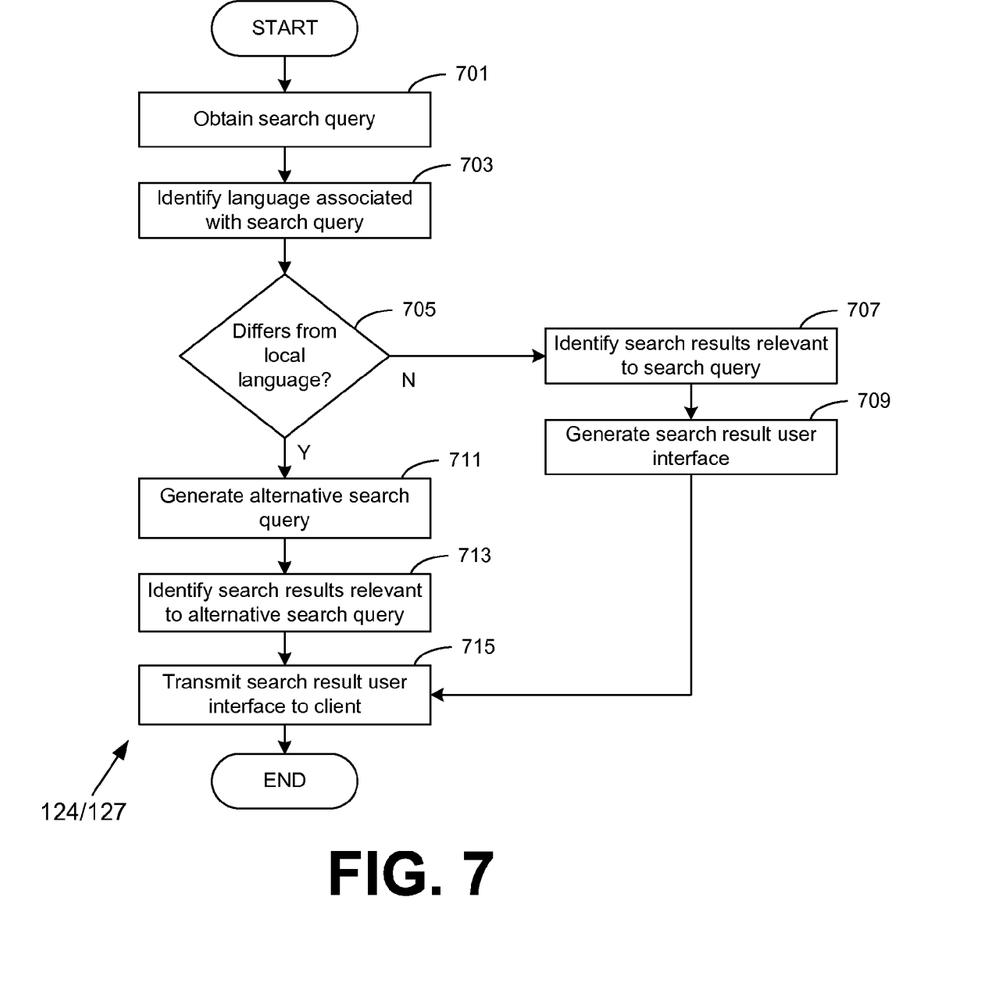

Moving now to FIG. 7, shown is a flowchart that provides one example of the operation of a portion of the electronic commerce application 124 (FIG. 1) and/or search engine application 127 according to various embodiments. It is understood that the flowchart of FIG. 7 provides merely an example of the many different types of functional arrangements that may be employed to implement the operation of the portion of the functionality as described herein. As an alternative, the flowchart of FIG. 7 may be viewed as depicting an example of steps of a method implemented in the computing device 103 (FIG. 1) according to one or more embodiments.

Beginning with box 701, the electronic commerce application 124 obtains a search query. As described above, the search query can be submitted from a client 115 via a browser 157. The electronic commerce application 124 can invoke the search engine application 127 and in box 703, a language associated with the search query is identified by the search engine application 127. In box 705, the search engine application 124 can determine whether the language of the search query differs from an expected language associated with the electronic commerce application 124. If the language of the search query matches the expected language, then in box 505 the search engine application 127 identifies search results that are relevant to the search query. The electronic commerce application 124 and/or search engine application 127 can generate a search result user interface including at least a subset of the search results in box 709. As described above, the search result user interface can be generated using a page template 149 as well as images 151 and/or strings 153 referenced by the page template 149. In box 715, the search result user interface is transmitted to a client 115 associated with the search request.

If the language of the search query differs from the expected language, then in box 711, the search engine application 127 generates an alternative search query that corresponds to the original search query. As described herein, there are various approaches that can be taken to generate an alternative search query. For example, a translated search query into the expected language can be generated. A search query that includes the original search and the translated search query can also be generated in another example. In box 713, the search engine application 127 can identify search results that are relevant to the alternative search query. In box 715, a search result user interface including at least a subset of the search results is transmitted to a client corresponding to the search request.

Figure 8:
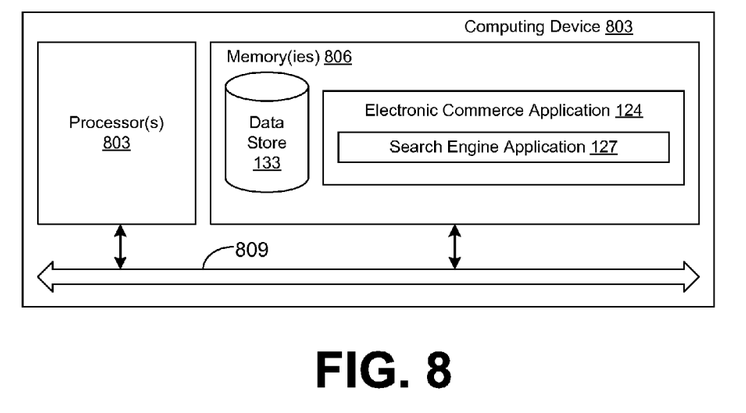
FIG. 8 is a schematic block diagram that provides one example illustration of a computing device employed in the networked environment of FIG. 1 according to various embodiments of the present disclosure.

With reference to FIG. 8, shown is a schematic block diagram of the computing device 103 (FIG. 1) according to an embodiment of the present disclosure. The computing device 103 includes a processor circuit, for example, having a processor 803 and a memory 806, both of which are coupled to a local interface 809. To this end, the computing device 103 may comprise, for example, a server computer or like device. The local interface 809 may comprise, for example, a data bus with an accompanying address/control bus or other bus structure as can be appreciated.

Stored in the memory 806 are both data and several components that are executable by the processor 803. In particular, stored in the memory 806 and executable by the processor 803 are an electronic commerce application 124 (FIG. 1), a search engine application 127 (FIG. 1), and potentially other applications. Also stored in the memory 806 may be a data store 133 (FIG. 1) and other data. In addition, a server operating system may be stored in the memory 806 and executable by the processor 803.

It is understood that there may be other applications that are stored in the memory 806 and are executable by the processors 803 as can be appreciated. Where any component discussed herein is implemented in the form of software, any one of a number of programming languages may be employed such as, for example, C, C++, Java, Java Script, Perl, Python, Flash, or other programming languages.

A number of software components are stored in the memory 806 and are executable by the processor 803. In this respect, the term "executable" means a program file that is in a form that can ultimately be run by the processor 803. Examples of executable programs may be, for example, a compiled program that can be translated into machine code in a format that can be loaded into a random access portion of the memory 806 and run by the processor 803, source code that may be expressed in proper format such as object code that is capable of being loaded into a random access portion of the memory 806 and executed by the processor 803, or source code that may be interpreted by another executable program to generate instructions in a random access portion of the memory 806 to be executed by the processor 803, etc. An executable program may be stored in any portion or component of the memory 806 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 806 is defined herein as including both volatile and nonvolatile memory and data storage components. Volatile components are those that do not retain data values upon loss of power. Nonvolatile components are those that retain data upon a loss of power. Thus, the memory 806 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 803 may represent multiple processors 803 and the memory 806 may represent multiple memories 806 that operate in parallel processing circuits, respectively. In such a case, the local interface 809 may be an appropriate network that facilitates communication between any two of the multiple processors 803, between any processor 803 and any of the memories 806, or between any two of the memories 806, etc. The local interface 809 may comprise additional systems designed to coordinate this communication, including, for example, performing load balancing. The processor 803 may be of electrical or of some other available construction.

Although the electronic commerce application 124, the search engine application 127, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 6 and 7 show the functionality and operation of an implementation of portions of the electronic commerce application 124 and/or search engine application 127. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a computer system or other system. The machine code may be converted from the source code, etc. If embodied in hardware, each block may represent a circuit or a number of interconnected circuits to implement the specified logical function(s).

Although the flowcharts of FIGS. 6 and 7 show a specific order of execution, it is understood that the order of execution may differ from that which is depicted. For example, the order of execution of two or more blocks may be scrambled relative to the order shown. Also, two or more blocks shown in succession in FIGS. 6 and 7 may be executed concurrently or with partial concurrence. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the electronic commerce application 124 and the search engine application 127, that comprises software or code can be embodied in any computer-readable medium for use by or in connection with an instruction execution system such as, for example, a processor in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer readable medium can comprise any one of many physical media such as, for example, electronic, magnetic, optical, electromagnetic, infrared, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

The invention claimed is:

1. A non-transitory computer-readable medium having instructions executable by a first computing device stored thereon, the instructions, when executed by the first computing device, causing the first computing device to at least:
   obtain a search query associated with a search request comprising at least one search term;
   detect a language associated with the search query;
   determine whether the language associated with the search query differs from an expected language;
   generate a search result user interface including at least one alternative search result from a catalog based at least in part upon the search query and the language when the language differs from the expected language; and
   generate a page for display on a user screen, the page comprising an alternative search result user interface corresponding to the language when a locale differs from the expected language, the alternative search result user interface comprising the at least one alternative search result and being based at least in part upon a first page template associated with the language, the first page template referencing at least one of a string or an image varying in size from a second page template associated with the expected language.

2. The non-transitory computer-readable medium of claim 1 further comprises further causing the first computing device to at least:
   identify at least one image referenced by the second page template;
   select a corresponding at least one image smaller than the at least one image; and
   replace the at least one image with the corresponding at least one image in the first page template.

3. A system, comprising:
   at least one computing device; and
   a search application executable in the at least one computing device, the search application configured to at least:
      obtain a search query associated with a search request, the search query comprising at least one search term;
      detect a language associated with the search query;
      determine whether the language associated with the search query differs from an expected language; and generate a page for display on a user screen, the page comprising an alternative search result user interface corresponding to the language when the language differs from the expected language, the alternative search result user interface comprising the at least one alternative search result and being based at least in part upon a first page template associated with the language, the first page template referencing at least one of a string or an image varying in size from a search result associated with the expected language.

4. The system of claim 3 the search application executable is further configured to at least:
identify a foreign language page template associated with the search result user interface; and
generate the alternative search result user interface corresponding to the foreign language page template.

5. The system of claim 3 the search application executable is further configured to at least:
identify the language associated with the search query; and
generate the alternative search result user interface with at least one string in the language associated with the search query.

6. The system of claim 5 the search application executable is further configured to at least:
retrieve at least one foreign language string corresponding to a page template associated with an expected language search result user interface from a data store associated with the at least one computing device; and
generate the alternative search result user interface with the at least one foreign language string.

7. The system of claim 5 the search application executable is further configured to at least:
generate at least one translation of at least one page template string into the language associated with the search query; and
generate the alternative search result user interface with the at least one translation.

8. The system of claim 3 the search application executable is further configured to at least:
identify at least one image referenced by a page template corresponding to the search result user interface containing a textual element;
select a corresponding at least one image in which the textual element is deemphasized relative to the at least one image; and
replace the at least one image with the corresponding at least one image in the page template corresponding to the search result user interface.

9. The system of claim 3 the search application executable is further configured to at least:
identify at least one image referenced by a page template corresponding to the search result user interface containing a textual element;
select a corresponding at least one image in which the textual element is translated into the foreign language; and
replace the at least one image with the corresponding at least one image in the page template corresponding to the search result user interface.

10. The system of claim 3 the search application executable is further configured to at least:
identify at least one image referenced by a page template corresponding to the search result user interface containing a graphical element;
select a corresponding at least one image in which the graphical element is emphasized relative to the at least one image; and
replace the at least one image with the corresponding at least one image in the page template corresponding to the search result user interface.

11. The system of claim 8, wherein the at least one image referenced by the page template comprises at least one of: a header image, a footer image, or an image associated with a navigational element.

12. The system of claim 3 the search application executable is further configured to at least:
identify a site associated with a locale corresponding to the language; and
redirect the search request to the site.

13. A method, comprising:
obtaining, in at least one computing device, a search query associated with a search request comprising at least one search term;
detecting, in the at least one computing device, a language associated with the search query;
determining, in the at least one computing device, whether the language associated with the search query differs from an expected language;
generating, in the at least one computing device, a page for display on a user screen, the page comprising a search result user interface including at least one alternative search result from a catalog based at least in part upon the search query and the language when the language differs from the expected language, wherein the catalog comprises data regarding one or more catalog items offered for sale by one or more merchants.

14. The method of claim 13, wherein generating the search result user interface including at least one alternative search result further comprises:
generating, in the at least one computing device, a translated search query based at least in part upon the search query;
obtaining, in the at least one computing device, at least one search result from the catalog that is relevant to the translated search query; and
populating, in the at least one computing device, the search result user interface with the at least one search result.

15. The method of claim 13, wherein generating the search result user interface including at least one alternative search result further comprises:
generating, in the at least one computing device, a translated search query based at least in part upon the search query;
obtaining, in the at least one computing device, at least one search result from the catalog that is relevant to the translated search query and the search query; and
populating, in the at least one computing device, the search result user interface with the at least one search result that is relevant to the translated search query and the search query.

16. The method of claim 13, wherein generating the search result user interface including at least one alternative search result further comprises:
identifying, in the at least one computing device, a site corresponding to a locale associated with the language;
submitting, from the at least one computing device, the search query to the site corresponding to the locale associated with the language;
obtaining, in the at least one computing device, at least one search result from a site catalog associated with the site that is relevant to the translated search query and the search query; and populating, in the at least one computing device, the search result user interface with the at least one search result that is relevant to the translated search query and the search query.

17. The method of claim 16, wherein populating, in the at least one computing device, the search result user interface with the at least one search result that is relevant to the translated search query and the search query further comprises:
suppressing, in the at least one computing device, at least one search result associated with a catalog item that is unsellable in the locale associated with the language.

18. The method of claim 13, wherein generating the search result user interface including at least one alternative search result further comprises:
identifying, in the at least one computing device, a catalog corresponding to a locale associated with the language;
identifying, in the at least one computing device, at least one search result related to the search query in the catalog corresponding to the locale; and
populating, in the at least one computing device, the search result user interface with the at least one search result.

19. The method of claim 13 wherein generating the search result user interface including at least one alternative search result further comprises:
identifying, in the at least one computing device, a site corresponding to a locale associated with the language; and
redirecting, from the at least one computing device, the search request to the site corresponding to the locale associated with the language.

20. The method of claim 13, further comprising:
generating, in the at least one computing device, an alternative search result user interface corresponding to the language when the language differs from the expected language; and
transmitting, from the at least one computing device, the alternative search result user interface to a client corresponding to the search request.

21. The method of claim 20, wherein generating the alternative search result user interface further comprises:
identifying, in the at least one computing device, a foreign language page template associated with the search result user interface; and
generating, in the at least one computing device, the alternative search result user interface corresponding to the foreign language page template.

22. The method of claim 21, wherein generating the alternative search result user interface corresponding to the foreign language template further comprises:
identifying, in the at least one computing device, at least one image referenced by a page template corresponding to the search result user interface containing a textual element;
selecting, in the at least one computing device, a corresponding at least one image that is smaller than the at least one image; and
replacing, in the at least one computing device, the at least one image in the page template corresponding to the search result user interface with the corresponding at least one image.

* * * * *